United States Patent

[11] 3,634,186

| [72] | Inventors | Edgar E. Bostick;<br>George L. Gaines, Jr., both of Scotia;<br>Donald G. Le Grand, Burnt Hills, all of N.Y. |
|---|---|---|
| [21] | Appl. No. | 839,695 |
| [22] | Filed | July 7, 1969 |
| [45] | Patented | Jan. 11, 1972 |
| [73] | Assignee | General Electric Company |

[54] LAMINATED STRUCTURES AND PROCESSES FOR PREPARING SAME
11 Claims, No Drawings

[52] U.S. Cl. ............................................... 161/183,
117/72, 117/76 P, 117/76 T, 117/126 GQ,
117/126 GS, 117/161 ZA, 117/161 ZB, 161/184,
161/188, 161/193, 161/208

[51] Int. Cl. ........................................................ B32b 27/28,
B44d 1/14, C08q 47/02

[50] Field of Search ............................................. 161/183,
184, 193, 208, 206, 188; 117/72, 76 P, 76 T, 126
A, 126 R, 126 GS, 126 GE, 126 GQ, 161 ZA, 161 ZB

[56] References Cited
UNITED STATES PATENTS

| 2,718,483 | 9/1955 | Clark | 161/193 |
|---|---|---|---|
| 3,087,908 | 4/1963 | Caird | 161/193 X |
| 3,157,560 | 11/1964 | Livingston et al. | 161/188 X |
| 3,239,478 | 3/1966 | Harlan | 161/247 X |
| 3,294,718 | 12/1966 | Antonen | 161/206 X |
| 3,308,079 | 3/1967 | Haenni | 117/161 X |
| 3,328,481 | 6/1967 | Vincent | 161/193 X |
| 3,519,465 | 7/1970 | Lyles | 161/208 X |
| 3,527,655 | 9/1970 | Ballard | 117/72 |
| 3,529,035 | 9/1970 | Lamoreaux | 161/193 X |
| 3,536,657 | 10/1970 | Noshay et al. | 260/37 |

FOREIGN PATENTS

| 1,142,817 | 2/1969 | Great Britain | |

*Primary Examiner*—Harold Ansher
*Attorneys*—Charles T. Watts, Paul A. Frank, Jane M. Binkowski, Frank L. Neuhauser, Oscar B. Waddell and Joseph B. Forman

ABSTRACT: A laminate structure having improved resistance to delamination because of enhanced interaction between the laminae and binder. The basic unit of this structure is a lamina which is initially coated or impregnated with a surface-active block copolymer and then coated or impregnated with a binder or base polymer. The clock copolymer contains a polymerized comonomer component which is compatible with the binder or base polymer thereby bonding it to the block copolymer, and a polymerized comonomer component which is sufficiently surface-active that the block copolymer wets and adheres to the lamina.

LAMINATED STRUCTURES AND PROCESSES FOR PREPARING SAME

LAMINATE AND METHOD

This application relates to the art of fabricating laminated bodies. Specifically, it relates to a novel process for making laminate structures having improved physical properties, as for example, a greater resistance to delamination, and is also concerned with the unique articles resulting from this process.

Conventionally, laminate structures are comprised of laminae held together by a suitable binder which is usually a synthetic resin or polymer. The laminae may be selected from a variety of materials in sheet form such as paper, woven fabrics, fiber mates, metal and glass.

In the past, laminated bodies have had limited application because of the tendency of the binder to separate from the laminae. Such poor delamination resistance may be caused by poor wetting of the laminae by the binder or may simply be attributable to poor adhesion of the two materials. For example, laminae formed from glass fibers such as glass cloth present problems of delamination because glass fibers are smooth and hygroscopic.

It is an object of the present invention to provide laminate structures having improved resistance to delamination by providing means for enhanced interaction between the lamina and binder. Specifically, we have discovered a surface-active agent which is substantially compatible with the binder and promotes adherence of the binder to the lamina.

Briefly and generally, the laminate of the present invention is formed from a lamina which is initially coated or impregnated with a surface-active block copolymer and then coated or impregnated with the binder referred to herein as the base polymer. The surface-active block copolymer contains two polymerized comonomers. One of the polymerized comonomer components is compatible or substantially miscible with the binder or base polymer. Because it, itself, is compatible, it tends to make the block copolymer compatible with the base polymer. By "compatible" it is meant substantially stable therein or substantially miscible therein. An example of such a compatibility-imparting polymerized comonomer is styrene for a base polymer such as polystyrene and polyphenyleneoxide. The second polymerized comonomer component must be sufficiently surface-active so that the block copolymer wets and adheres to the lamina. A typical example of such surface-activity-imparting comonomers are organosiloxanes such as dialkylsiloxanes, particularly dimethylsiloxane. The base polymer of the present composition, i.e. the polymer used as a binder, may be a homopolymer, a copolymer or even a mixture of polymers.

The block copolymer used in the present invention can vary in composition and structure. They may be graft, branched, or linear block copolymers, but being block copolymers, they contain repeating segments or blocks of the same monomeric unit and these blocks have a length close to the average block length for that particular monomer. However, the average block length of one polymerized comonomer component can differ from the average block length of a second polymerized comonomer component and the relative average block lengths largely determine the properties of the block copolymer.

An example of a linear block copolymer of A and B monomeric units may have the following structure:

...AAAAABBBAAAABBBBAAAAAABB...

where the A block has an average of 5 units and the B block averages 3 units. An example of a graft block copolymer of A and B monomeric units may have the following structure:

```
...AAAAAA...        ...AAAAAA...
      B                   B
      B                   B
      B                   B
      B                   B
```

As is well known in the art, the block copolymer is distinguishable from random copolymers which do not contain substantially uniform blocks of the same comonomer, e.g., copolymers which on the average contain no particular repeating sequence of the same monomeric units and which may have combinations of units varying widely in length and dispersion.

(e.g., ABAAAABABBAABBBABAB...).

Random copolymers, therefore, are not useful in the present invention since, as a practical matter, they cannot be prepared to have the predetermined properties of the present block copolymers.

The block copolymers of the present invention can be prepared by a number of conventional techniques. They should be prepared, however, so that they will have the desired compatibility with the base polymer and also be sufficiently surface-active to wet and adhere to the laminating base sheet. The molecular weight of the block copolymer may vary widely but it should be sufficiently high so that it is nonvolatile in the preparation and use of the laminate. Generally, the compatibility-imparting polymerized comonomer component of the block copolymer additive should have an average block length of at least three monomer units, and the surface-active polymerized comonomer component of the additive should have an average block length of at least five monomer units. The maximum average block length of each comonomer component can only be determined empirically, i.e., it depends largely on the amount of the block copolymer used with a particular base polymer and laminating base sheet since the effect of a particular polymerized comonomer component of the block copolymer additive can be reduced by using a smaller amount of the additive.

In the present invention, the surface-active component of the block copolymer wets the laminating base sheet, or lamina, and adheres the block copolymer thereto while the compatibility imparting component extends into the resin or base polymer to provide an enhanced interaction or bond between the laminating base sheet and base polymer.

The laminates of the present invention can vary widely in structure but must be comprised of at least one layer of a conventional laminating base sheet, to at least one surface of which the present surface-active block copolymer has been applied followed by the application of the base polymer to the deposited block copolymer.

Generally, the present laminate will be formed of a lamina, or laminating base sheet, which is paper or a woven fabric or mat formed from fibers such as glass, asbestos, or nylon. This lamina, in sheet form is impregnated with a solution of the block copolymer and allowed to dry. Preferably, in most instances, the block-copolymer treated lamina is heated at an elevated temperature to produce a more tenacious coating of the block copolymer. The dry block copolymer treated lamina is then impregnated with a solution of the base polymer and again allowed to dry. The desired number of such polymer treated laminae are placed upon one another and the stack consolidated under heat and pressure.

Another specific type of laminate which can be formed according to the present invention is one containing at least two laminae wherein one lamina is the base polymer, and the second lamina is a sheet of continuous inorganic material such as metal or glass. In such instance, a thin, uniform layer of the block copolymer, preferably in solution form, is deposited on a side of the inorganic sheet, dried, and preferably heated at elevated temperature in a number of instances to produce a more tenacious coating of the block copolymer. A layer of the base polymer is then applied to the block copolymer coating to form a composite which is then subjected to heat and pressure to produce the desired laminate.

There are a number of specific surface-active block-copolymer-base polymer systems which can be used in forming the laminates of the present invention. A typical example is a polycarbonate-polydimethylsiloxane block copolymer with polycarbonate as the base polymer. Another specific system is a polystyrene-polydimethylsiloxane block copolymer for use with base polymers such as polystyrene or polyphenyleneoxide. In addition, we have found that the block copolymer may contain certain substituents which impart to it the necessary compatibility, and an example of such a system is polydiphenylsiloxane-polydimethylsiloxane block copolymer with polymethylphenylsiloxane as the base polymer.

The amount of the block copolymer used may be determined empirically and would depend largely on its composition as well as the particular laminate to be formed. The block copolymer should be used in at least an amount sufficient to substantially form a film between the lamina and binder. The block copolymer should not, however, be used in an amount which would undesirably alter the bulk properties of the binder or base polymer to a significant extent. Specifically, where the laminating base sheet is impregnated with a solution of the block copolymer, the amount of block copolymer deposited would depend largely on the surface area of such a sheet, and generally, would range from about 1 to about 30 percent by weight of the laminating base sheet. For the type of laminate formed with a continuous laminating base sheet, such as a continuous metal sheet, the amount of block copolymer used would again depend largely on the surface area to be covered and generally, in this instance, would range from about 0.1 to about 10 percent by weight of the base polymer.

In some instances, the compatibility-imparting polymerized comonomer may differ substantially in structure from the base polymer but, in its block form, as a constituent of the block copolymer, it is capable of acting as the compatibility-imparting component of the block copolymer. For example, we have found that a polycarbonate-polydimethyl-siloxane block copolymer is compatible with an epoxy resin.

All parts and percentages used herein are by weight unless otherwise noted.

The invention is further illustrated by the following examples.

In the following examples, the tests and materials used were as follows:

The polycarbonate (Standard Molding Grade 106) used is sold under the trademark Lexan and is a polycarbonate of 2,2-bis(4-hydroxyphenyl) propane (Bisphenol A).

The polycarbonate-polydimethylsiloxane block copolymer was prepared substantially as set forth in U.S. Pat. No. 3,189,662, issued June 15, 1965 and assigned to the same assignee as the present invention. The polycarbonate was the intercondensation product of 2,2-bis(4-hydroxyphenyl) propane and phosgene.

The polydiphenylsiloxane-polydimethylsiloxane block copolymer and polydimethylsiloxane-polymethylvinyl-siloxane-polydiphenylsiloxane block terpolymer was prepared as set forth in U.S. Pat. No. 3,337,497 issued Aug. 22, 1967.

The particular composition and average block length of the block copolymer was determined by method of preparation, by nuclear magnetic resonance spectroscopy and elemental analysis.

The molecular weight is the number average molecular weight $\bar{M}_n$ (osmotic).

The epoxy resin was formed from epichlorohydrin and 2,2-bis(p-hydroxyphenyl) propane known as "Bisphenol-A." It had an epoxy equivalent of 185–192 and is sold under the trademark Epon 828.

The woven glass cloth used in forming laminates was a 2-inch wide tape with a selvage edge. It has a plain-weave (style 164) and weighed about 10.5 ounces per square yard. Before use, it was heated in an oven in a nitrogen gas atmosphere at 400° C. for at least 30 minutes to remove the sizing. It was then cut to form 4 inch long strips which were used to form laminates. In examples 2, and 3 the strips were cut in half along their length to form 1 inch wide strips.

EXAMPLE 1

A chloroform solution of a polycarbonate-polydimethylsiloxane block copolymer was prepared at room temperature. The polycarbonate-polydimethylsiloxane block copolymer was a solid and was comprised of 87 percent by weight polycarbonate having an average block length of 40 monomer units and 13 percent by weight polydimethylsiloxane having an average block length of 20 monomer units.

A clean glass microscope slide was dipped into the block copolymer solution and then heated in an oven at 225° C. for 2 hours. A tenacious continuous coating of the block copolymer had formed on the glass slide.

A chloroform solution of polycarbonate was formed and it was deposited on a surface of the block copolymer treated slide and allowed to dry at room temperature in air. The resulting dried polycarbonate film was tightly bonded to the slide and could be scraped off only with difficulty. For comparison purposes, a polycarbonate film was cast directly on a clean glass microscope slide in the same manner and allowed to dry at room temperature in the same manner. This film peeled off the glass easily and showed little adhesion.

EXAMPLE 2

The polycarbonate-polydimethylsiloxane block copolymer was the same as that disclosed in example 1.

A number of 4 inch long strips of glass cloth tape, 1 inch wide, were immersed into a 10-percent methylene chloride solution of the block copolymer at room temperature until they were thoroughly wetted. They were then dried in an oven at 200° C. for 10 minutes. Each of the dried coated tapes had a block copolymer deposit of about 10 milligrams per square inch of the tape.

Two of these coated strips were used to form a laminate having a 3 inch long lap joint with the free end of each strip extending about 1 inch therefrom in opposite directions. Specifically, a 3 inch strip of polycarbonate film 2 mils in thickness and 1 inch wide, was placed on a 3 inch long end portion of one strip and covered by a 3 inch end portion of a second strip. This structure was then placed in a Carver hydraulic press, heated at 250° C. under 5,000 p.s.i. for 5 minutes and then allowed to cool to room temperature.

The resulting lap-joint laminate was tested at room temperature initially by hand-pulling at its free ends in opposite directions. No separation of the cloth tape in the lap joint of the laminate was observed. The laminate, was then hand flexed at room temperature through an angle of 180° a number of times and no separation of the glass cloth tape in the lap joint of the laminate was observed. This laminate was a smooth, tough, flexible material which snapped back to its initial form at the end of each flexing.

This laminate was then immersed in liquid nitrogen, removed therefrom and immediately tested at its temperature of about 77° K. Its free ends were pulled with tongs in opposite directions but no separation of he glass cloth in the lap joint of the laminate was observed. It was also flexed with tongs at its temperature of about 77° K. through an angle of 180° a number of times and showed no signs of separation of the tape in the lap joint of the laminate.

For purposes of comparison, a control laminate with a lap joint was prepared in the same manner, except that the glass cloth tape was not treated with the block copolymer, and it was tested in the same manner. Pulling at its free ends at room temperature in opposite directions showed some separation of the glass cloth tape in the lap joint of this control laminate. This control was then hand flexed at room temperature through an angle of 180°, and at the completion of the first flexing, it showed additional separation of the glass cloth tape in the lap joint. With each additional flexing it showed additional separation of the bonded tape. The control laminate was then immersed in liquid nitrogen, removed therefrom, and tested at its temperature of about 77° K. Its free ends were pulled with tongs in opposite directions and additional separation of the glass cloth tape was observed in the lap joint. Flexing of the control laminate at its temperature of about 77° K. through an angle of 180° resulted in fraying and cracking of the glass cloth tape and additional separation of the tape in the lap joint.

EXAMPLE 3

A number of the block copolymer treated strips of glass cloth tape prepared in example 2 were used to form laminates for determining peel strength.

Specifically, a laminate was prepared by forming a sandwich of two of the block copolymer-treated strips with a 3-inch strip of polycarbonate film, 2 mils in thickness and 1 inch wide, placed intermediate the two strips. The polycarbonate film covered a 3 inch long end portion of the strips leaving a free end of one strip coextensive with the free end of the second strip. An aluminum spacer was placed between these two free ends and the resulting structure was placed in a Carver hydraulic press, and heated at a temperature of 250° C. under a pressure of 5,000 p.s.i. for 5 minutes and then allowed to cool at room temperature.

To determine peel strength at room temperature, the coextensive free ends of the resulting laminate were hand-pulled in opposite directions. No separation of the bonded glass cloth tape was observed, but after about 10 such pullings at room temperature, some breaking within the intermediate polycarbonate layer was observed showing, therefore, some cohesive failure but no adhesive failure.

The peel strength of this laminate was determined at about 77° K. The laminate was immersed in liquid nitrogen, removed therefrom, and immediately tested at its temperature of about 77° K. Its free ends were pulled with tongs in opposite directions, but no separation of the bonded glass cloth tape was observed. After about 10 such pullings, however, some breaking within the intermediate polycarbonate film occurred.

For purposes of comparison, a control laminate was prepared in the same manner, except that the glass cloth tape was not treated with block copolymer. This control was tested in the same manner. The free ends of the control were hand-pulled in opposite directions at room temperature. With the first such hand pulling, the tape frayed and there was some separation of the bonded tape. With each additional hand-pulling, additional separation of the bonded tape occurred. The control laminate was then immersed in liquid nitrogen, removed therefrom, and its peel strength tested at its temperature of about 77° K. The results were the same as at room temperature.

EXAMPLE 4

The polycarbonate-polydimethylsiloxane block copolymer was the same as that disclosed in example 1.

A number of 4-inch strips of glass cloth tape, 2 inches wide, were immersed into a 10 percent methylene chloride solution of the block copolymer at room temperature until they were thoroughly wetted. They were then dried and heated in an oven at 200° C. for 10 minutes. Each of the dried coated tapes had a block copolymer deposits of about 10 milligrams per square inch. Each of these strips was then immersed in a 60 percent solids solution composed of 8 parts of Epon 828, 9 parts methyl nadic anhydride, 0.08 part benzyldimethylamine in 80/20 methylene chloride/dioxane mixed solvent.

A laminate was prepared by stacking four of the strips, one on the other to form a composite which was precured in an oven at atmospheric pressure at a temperature of 100° C. for 15 minutes. The resulting precured composite was then finally cured by placing it in a Carver hydraulic press and heating it at 150° C. under pressure of 2,000 p.s.i. for 20 minutes. A sample was prepared from the resulting laminate and tested for failure according to ASTMD-790.

At room temperature, the sample underwent ductile failure, i.e., the sample deformed but there was no evidence of delamination of the bonded tape. A second sample was formed from the laminate and it was immersed in liquid nitrogen and immediately after removal therefrom, it was deflected by doubling it at its temperature of about 77° K. It underwent ductile failure in substantially the same manner as the sample tested at room temperature.

For purpose of comparison, a control laminate was prepared in the same manner, except that the glass cloth tape was not treated with the block copolymer, and it was tested in the same manner. A sample was prepared from the control laminate and tested for failure according to ASTMD 790. At room temperature the sample underwent brittle failure, i.e., a sharp, shattering-type rupture accompanied by significant delamination of the bonded tape. A second sample was formed from the control laminate and was cooled by immersion in liquid nitrogen to about 77° K., and immediately after removal therefrom it was deflected by doubling it. This sample also underwent brittle failure accompanied by significant delamination of the bonded tape.

EXAMPLE 5

The block copolymer was a terpolymer composed of 45.5 weight percent polydimethylsiloxane having a number average molecular weight of 114,270 g./mole and an average block length of 1,540 monomer units, 9.2 weight percent polymethylvinylsiloxane having a number average molecular weight of 15,000 g./mole and an average block length of 135 monomer units, and 45.4 weight percent polydiphenylsiloxane having a number average molecular weight of 57,130 g./mole and an average block length of 288 units.

A number of 4-inch strips of glass cloth tape, 2 inches wide, were immersed in a 10-percent solids methylene chloride solution of the terpolymer until they were thoroughly wetted. They were then dried in an oven at a temperature of 200° C. for 10 minutes and allowed to cool to room temperature. Each of these strips had a terpolymer deposit of about 0.15 grams per square inch. Each of these strips was then immersed, at room temperature, in a 60-percent solids toluene solution of a curable polymethylphenylsiloxane sold under the trademark SR313 until they were thoroughly wetted, and then they were precured in an oven at a temperature of 150° C. for 5 minutes. The preparation of this curable polymethylphenylsiloxane composition is disclosed in U.S. Pat. NOS. 2,258,218 through 2,258,222 and 2,449,572, all assigned to the assignee of the present invention. Each of the dried strips had a polymethylphenylsiloxane content of about 0.09 grams per square inch. Four of these strips were then tacked on one another to form a composite which was cured by placing it in a Carver hydraulic press, heating it at 175° C. under a pressure of 2,000 p.s.i. for 30 minutes and allowing it to cool to room temperature. A sample was prepared from the resulting laminate and was tested according to ASTMD 790. At room temperature, the sample underwent ductile failure without any evidence of delamination of the bonded tape. A second sample was formed from the laminate, and it was immersed in liquid nitrogen, and immediately after removal therefrom, it was deflected by doubling it at its temperature of about 77° K. It underwent ductile failure in substantially the same manner as the sample at room temperature.

For purposes of comparison, a control laminate was prepared in the same manner, except that the glass cloth tape was not treated with the block copolymer, and it was tested in the same manner. A sample was prepared from the control laminate and tested for failure according to ASTMD 790. At room temperature the sample underwent brittle failure, i.e., a sharp, shattering-type rupture accompanied by significant delamination of the bonded tape. A second sample was formed from the control laminate and was cooled by immersion in liquid nitrogen to about 77° K. and immediately after removal therefrom it was deflected by doubling it. This sample also underwent brittle failure accompanied by significant delamination of the bonded tape.

In copending U.S. Pat. application Ser. No. 839,616 (RD-2348, filed on the same day as the present patent application by Edgar E. Bostick, George L. Gaines, Jr. and Donald G. LeGrand, and assigned to the same assignee as the present invention, there is disclosed a polymer-filler composition having improved properties comprised of a base polymer, a filler and a surface-active block copolymer.

What is claimed is:

1. A process for preparing a laminate structure with improved delamination resistance comprising applying a surface-active block copolymer to a surface of a lamina and then applying a base polymer to said block copolymer-treated surface, said block copolymer containing a first polymerized comonomer and a second polymerized copolymer, said first polymerized comonomer having an average block length of at least three monomer units and being compatible with the base polymer providing an enhanced bond between said lamina surface and said base polymer, and said second polymerized comonomer having an average block length of at least five monomer units and being sufficiently surface-active to wet said lamina surface and adhere said block copolymer thereto.

2. A process according to claim 1 wherein said base polymer is a polycarbonate and said block copolymer is a polycarbonate-polydimethylsiloxane block polymer.

3. A process according to claim 1 wherein said base polymer is an epoxy resin and said block copolymer is a polycarbonate-polydimethylsiloxane block copolymer.

4. A process according to claim 1 wherein said block copolymer is a polydimethylsiloxane-polymethylvinylsiloxane-polydiphenylsiloxane block terpolymer and said base polymer is polymethylphenylsiloxane.

5. A process for preparing a polymer-impregnated laminate structure with improved delamination resistance which comprises immersing a glass fiber cloth in a solution of a surface-active block copolymer, drying said cloth, immersing the dried cloth in a solution of base polymer, forming a composite of the resulting polymer-impregnated cloth with a second polymer-impregnated cloth formed in the same manner, subjecting said composite to heat and pressure to form a laminate structure, said block copolymer containing a first polymerized comonomer and a second polymerized comonomer, said first polymerized comonomer having an average block length of at least three monomer units and being compatible with the base polymer providing an enhanced bond between said glass cloth and said base polymer, and said second polymerized comonomer having an average block length of at least five monomer units and being sufficiently surface-active to wet said glass cloth surface and adhere said block copolymer to the glass cloth.

6. A laminate structure having improved delamination resistance formed from a laminating base sheet having at least one surface coated with a surface-active block copolymer and a layer of base polymer deposited onto the block copolymer coating, said surface-active block copolymer containing a first polymerized comonomer and a second polymerized comonomer, said first polymerized comonomer having an average block length of three monomer units and being compatible with the base polymer providing an enhanced bond between said laminating base sheet surface and said base polymer and the second polymerized comonomer having an average block length of at least five monomer units being sufficiently surface-active to wet said laminating base sheet surface and adhere said block copolymer thereto.

1. A laminate having improved properties formed from a porous laminating base sheet impregnated initially with a surface-active block copolymer followed by impregnation with a base polymer, said surface-active block copolymer containing a first polymerized comonomer and a second polymerized comonomer, said first polymerized comonomer having an average block length of at least three monomer units and being compatible with the base polymer providing an enhanced bond between said porous laminating base sheet and said base polymer, and the second polymerized comonomer having an average block length of at least five monomer units being sufficiently surface-active to wet said porous laminating base sheet and adhere said block copolymer thereto.

8. A laminate according to claim 7 wherein the base polymer is polycarbonate and the block copolymer is a polycarbonate-polydimethylsiloxane block copolymer.

9. A laminate according to claim 7 wherein the base polymer is an epoxy resin and said block copolymer is a polycarbonate-polydimethylsiloxane block copolymer.

10. A laminate according to claim 7 wherein the base polymer is polymethylphenylsiloxane and said block copolymer is a polydimethylsiloxane-polymethylvinylsiloxane-polydiphenylsiloxane block terpolymer.

11. An article comprising a base sheet substrate having applied thereto a surface-active block copolymer, said block copolymer containing at least one polymerized comonomer which is surface-active and forms an adherent stable bond to a surface of the substrate and at least one polymerized comonomer which forms a stable solid coating on said surface of said substrate, said block copolymer being selected from the group consisting of polycarbonate-polydimethylsiloxane block copolymer and polydimethylsiloxane-polymethylvinylsiloxane-polydiphenylsiloxane block terpolymer.

* * * * *